United States Patent
Chan et al.

(10) Patent No.: US 10,546,208 B2
(45) Date of Patent: Jan. 28, 2020

(54) METHOD, SYSTEM AND APPARATUS FOR SELECTING A VIDEO FRAME

(71) Applicant: CANON KABUSHIKI KAISHA, Tokyo (JP)

(72) Inventors: Sammy Chan, Beecroft (AU); Ian Robert Boreham, Gordon (AU); Ka Ming Leung, Marsfield (AU); Mark Ronald Tainsh, Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 15/714,959

(22) Filed: Sep. 25, 2017

(65) Prior Publication Data
US 2018/0089528 A1    Mar. 29, 2018

(30) Foreign Application Priority Data

Sep. 27, 2016 (AU) .................................. 2016231661

(51) Int. Cl.
*G06K 9/00* (2006.01)
*G06K 9/46* (2006.01)

(52) U.S. Cl.
CPC ....... *G06K 9/4604* (2013.01); *G06K 9/00765* (2013.01); *G06K 9/4652* (2013.01); *G06K 9/00711* (2013.01); *G06K 9/00744* (2013.01)

(58) Field of Classification Search
CPC .............. G06K 9/4604; G06K 9/4652; G06K 9/00711; G06K 9/00744; G06K 9/00765; G06K 9/036
See application file for complete search history.

(56) References Cited

U.S. PATENT DOCUMENTS

| | | | |
|---|---|---|---|
| 6,449,392 B1 * | 9/2002 | Divakaran | G06K 9/00711 348/E5.067 |
| 6,549,643 B1 | 4/2003 | Toklu et al. | |

(Continued)

FOREIGN PATENT DOCUMENTS

JP    2008-154047 A    7/2008

OTHER PUBLICATIONS

Hu et al. ("A Survey on Visual Content-Based Video Indexing and Retrieval," IEEE Transactions on Systems, Man, and Cybernetics, Part C, vol. 41, No. 6, Nov. 2011) (Year: 2011) (Year: 2011) (Year: 2011) (Year: 2011) (Year: 2011) (Year: 2011) (Year : 2011) (Year: 2011) (Year: 2011).*

(Continued)

*Primary Examiner* — Yubin Hung
(74) *Attorney, Agent, or Firm* — Canon U.S.A., Inc. IP Divison

(57) ABSTRACT

A method of selecting at least one video frame of a video sequence comprising a plurality of video frames. The method determines a time for analysis based on length of the video sequence and processing capability of a running device. A first sampling pattern is based on the determined time for analysis. A first set of frames in the video sequence is sampled using a first sampling pattern. The first set is sampled infrequently throughout the video sequence in accordance with the first sampling pattern. A candidate frame is determined from the sampled frames based on image quality. A second set of the frames comprising one or more of the frames in a narrow range of the video sequence near the determined candidate frame, is determined in accordance with a second sampling pattern. At least one of the video frames is selected from the sampled frames based on image quality.

23 Claims, 10 Drawing Sheets

(56) References Cited

U.S. PATENT DOCUMENTS

| | | | |
|---|---|---|---|
| 6,697,523 B1 | 2/2004 | Divakaran et al. | |
| 8,379,154 B2 | 2/2013 | Zhang | |
| 10,013,640 B1* | 7/2018 | Angelova | G06K 9/00624 |
| 2002/0031252 A1* | 3/2002 | Rozin | G06T 17/00 |
| | | | 382/154 |
| 2003/0095720 A1* | 5/2003 | Chiu | H04N 5/262 |
| | | | 382/284 |
| 2004/0223730 A1* | 11/2004 | Sugimoto | G11B 27/034 |
| | | | 386/241 |
| 2005/0200762 A1* | 9/2005 | Barletta | G06K 9/00711 |
| | | | 348/700 |
| 2006/0018562 A1* | 1/2006 | Ruggiero | G06F 9/3879 |
| | | | 382/300 |
| 2009/0083781 A1* | 3/2009 | Yang | G11B 27/105 |
| | | | 725/20 |
| 2012/0106806 A1* | 5/2012 | Folta | G06K 9/00295 |
| | | | 382/118 |
| 2012/0275511 A1* | 11/2012 | Shemer | H04N 19/139 |
| | | | 375/240.02 |
| 2013/0128063 A1* | 5/2013 | Jin | G06T 7/33 |
| | | | 348/208.4 |
| 2013/0148940 A1* | 6/2013 | Schmit | H04N 5/783 |
| | | | 386/230 |
| 2015/0256905 A1* | 9/2015 | Lee | H04N 21/233 |
| | | | 725/18 |
| 2015/0350747 A1* | 12/2015 | Jackson | H04N 21/8549 |
| | | | 725/38 |
| 2016/0155012 A1* | 6/2016 | Takahashi | G06K 9/00986 |
| | | | 382/281 |

OTHER PUBLICATIONS

Luo et al. ("Towards Extracting Semantically Meaningful Key Frames From Personal Video Clips: From Humans to Computers," IEEE Transactions on Circuits and Systems for Video Technology, vol. 19, No. 2 , Feb. 2009) (Year: 2009).*

* cited by examiner

METHOD, SYSTEM AND APPARATUS FOR SELECTING A VIDEO FRAME

REFERENCE TO RELATED PATENT APPLICATION(S)

This application claims the benefit under 35 U.S.C. § 119 of the filing date of Australian Patent Application No. 2016231661, filed 27 Sep. 2016, hereby incorporated by reference in its entirety as if fully set forth herein.

TECHNICAL FIELD

The present invention relates generally to image processing and, in particular, to a method, system and apparatus for selecting a video frame of a video sequence. The present invention also relates to a computer program product including a computer readable medium having recorded thereon a computer program for selecting a video frame of a video sequence.

BACKGROUND

Video is an effective way to capture a scene or an unfolding event. People often capture a video sequence for birthday parties, weddings, travel and sports events. Unlike still images, video has an advantage of capturing evolving, unstructured events, such as particular natural facial expressions and human interactions (e.g. talking, mutual smiling, kissing, hugging, handshakes). It is often desirable to select individual frames from a sequence of video frames for display or for use as content in printed books in the same way as still images are used.

With increasing demand and accessibility of mobile phones and other consumer oriented camera devices, more and more video data is being captured and stored. Videos present a problem due to the large number of frames of a video sequence that are candidates for selection for printing or display. A video of 10 minutes may have eighteen thousand frames.

A common scenario for frame selection is that a user selects a number of video sequences and requests that a selection system process the selected video sequences to select frames for printing or display. An example is a user providing a set of video sequences captured within a particular year and requesting a photobook for that year made up of frames selected from the selected video sequences. The user expects the selection system to operate in a timely manner. The user might expect, for example, that the selection system process an hour long set of video sequences in less than ten minutes. Such an expectation presents a challenge when the processing system may be a personal computer or mobile device.

SUMMARY

It is an object of the present invention to substantially overcome, or at least ameliorate, one or more disadvantages of existing arrangements.

According to one aspect of the present disclosure, there is provided a method of selecting at least one video frame of a video sequence comprising a plurality of video frames, said method comprising:

determining a time for analysis based on length of the video sequence and processing capability of a running device;

determining a first sampling pattern based on the determined time for analysis;

sampling a first set of said frames in the video sequence using a first sampling pattern, wherein the frames of the first set are sampled infrequently throughout the video sequence in accordance with the first sampling pattern;

determining a candidate frame from the sampled frames based on image quality;

sampling a second set of said frames comprising one or more of the frames in a narrow range of the video sequence near the determined candidate frame, in accordance with a second sampling pattern; and selecting at least one of the video frames from the sampled frames based on image quality.

According to another aspect of the present disclosure, there is provided an apparatus for selecting at least one video frame of a video sequence comprising a plurality of video frames, said apparatus comprising:

means for determining a time for analysis based on length of the video sequence and processing capability of a running device;

means for determining a first sampling pattern based on the determined time for analysis;

means for sampling a first set of said frames in the video sequence using a first sampling pattern, wherein the frames of the first set are sampled infrequently throughout the video sequence in accordance with the first sampling pattern;

means for determining a candidate frame from the sampled frames based on image quality;

means for sampling a second set of said frames comprising one or more of the frames in a narrow range of the video sequence near the determined candidate frame, in accordance with a second sampling pattern; and means for selecting at least one of the video frames from the sampled frames based on image quality.

According to still another aspect of the present disclosure, there is provided a system for selecting at least one video frame of a video sequence comprising a plurality of video frames, said system comprising:

a memory comprising data and a computer program; and a processor coupled to the memory for executing the computer program, the computer program having instructions for:

determining a time for analysis based on length of the video sequence and processing capability of a running device;

determining a first sampling pattern based on the determined time for analysis;

sampling a first set of said frames in the video sequence using a first sampling pattern, wherein the frames of the first set are sampled infrequently throughout the video sequence in accordance with the first sampling pattern;

determining a candidate frame from the sampled frames based on image quality;

sampling a second set of said frames comprising one or more of the frames in a narrow range of the video sequence near the determined candidate frame, in accordance with a second sampling pattern; and selecting at least one of the video frames from the sampled frames based on image quality.

According to still another aspect of the present disclosure, there is provided a non-transitory computer readable medium having a computer program stored on the medium for selecting at least one video frame of a video sequence comprising a plurality of video frames, said program comprising:

code for determining a time for analysis based on length of the video sequence and processing capability of a running device;

code for determining a first sampling pattern based on the determined time for analysis;

code for sampling a first set of said frames in the video sequence using a first sampling pattern, wherein the frames of the first set are sampled infrequently throughout the video sequence in accordance with the first sampling pattern;

code for determining a candidate frame from the sampled frames based on image quality;

code for sampling a second set of said frames comprising one or more of the frames in a narrow range of the video sequence near the determined candidate frame, in accordance with a second sampling pattern; and code selecting at least one of the video frames from the sampled frames based on image quality.

According to still another aspect of the present disclosure, there is provided a method of selecting at least one video frame from a video sequence comprising a plurality of video frames, said method comprising:

sampling a first set of said frames in the video sequence using a first sampling pattern, wherein the frames of the first set are sampled infrequently throughout the video sequence in accordance with the first sampling pattern;

determining a candidate frame from the sampled frames based on image quality;

sampling a second set of said frames comprising one or more said frames in a narrow range of the video sequence near the candidate frame, in accordance with a second sampling pattern; and selecting at least one of the video frames from the sampled frames based on image quality.

According to still another aspect of the present disclosure, there is provided an apparatus for selecting at least one video frame from a video sequence comprising a plurality of video frames, said apparatus comprising:

means for sampling a first set of said frames in the video sequence using a first sampling pattern, wherein the frames of the first set are sampled infrequently throughout the video sequence in accordance with the first sampling pattern;

means for determining a candidate frame from the sampled frames based on image quality;

means for sampling a second set of said frames comprising one or more said frames in a narrow range of the video sequence near the candidate frame, in accordance with a second sampling pattern; and means for selecting at least one of the video frames from the sampled frames based on image quality.

According to still another aspect of the present disclosure, there is provided a system for selecting at least one video frame from a video sequence comprising a plurality of video frames, said system comprising:

a memory comprising data and a computer program; and a processor coupled to the memory for executing the computer program, the computer program having instructions for:

sampling a first set of said frames in the video sequence using a first sampling pattern, wherein the frames of the first set are sampled infrequently throughout the video sequence in accordance with the first sampling pattern;

determining a candidate frame from the sampled frames based on image quality;

sampling a second set of said frames comprising one or more said frames in a narrow range of the video sequence near the candidate frame, in accordance with a second sampling pattern;

selecting at least one of the video frames from the sampled frames based on image quality.

According to still another aspect of the present disclosure, there is provided a non-transitory computer readable medium having a program stored on the medium for selecting at least one video frame from a video sequence comprising a plurality of video frames, said program comprising:

code for sampling a first set of said frames in the video sequence using a first sampling pattern, wherein the frames of the first set are sampled infrequently throughout the video sequence in accordance with the first sampling pattern;

code for determining a candidate frame from the sampled frames based on image quality;

code for sampling a second set of said frames comprising one or more said frames in a narrow range of the video sequence near the candidate frame, in accordance with a second sampling pattern; and code for selecting at least one of the video frames from the sampled frames based on image quality.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
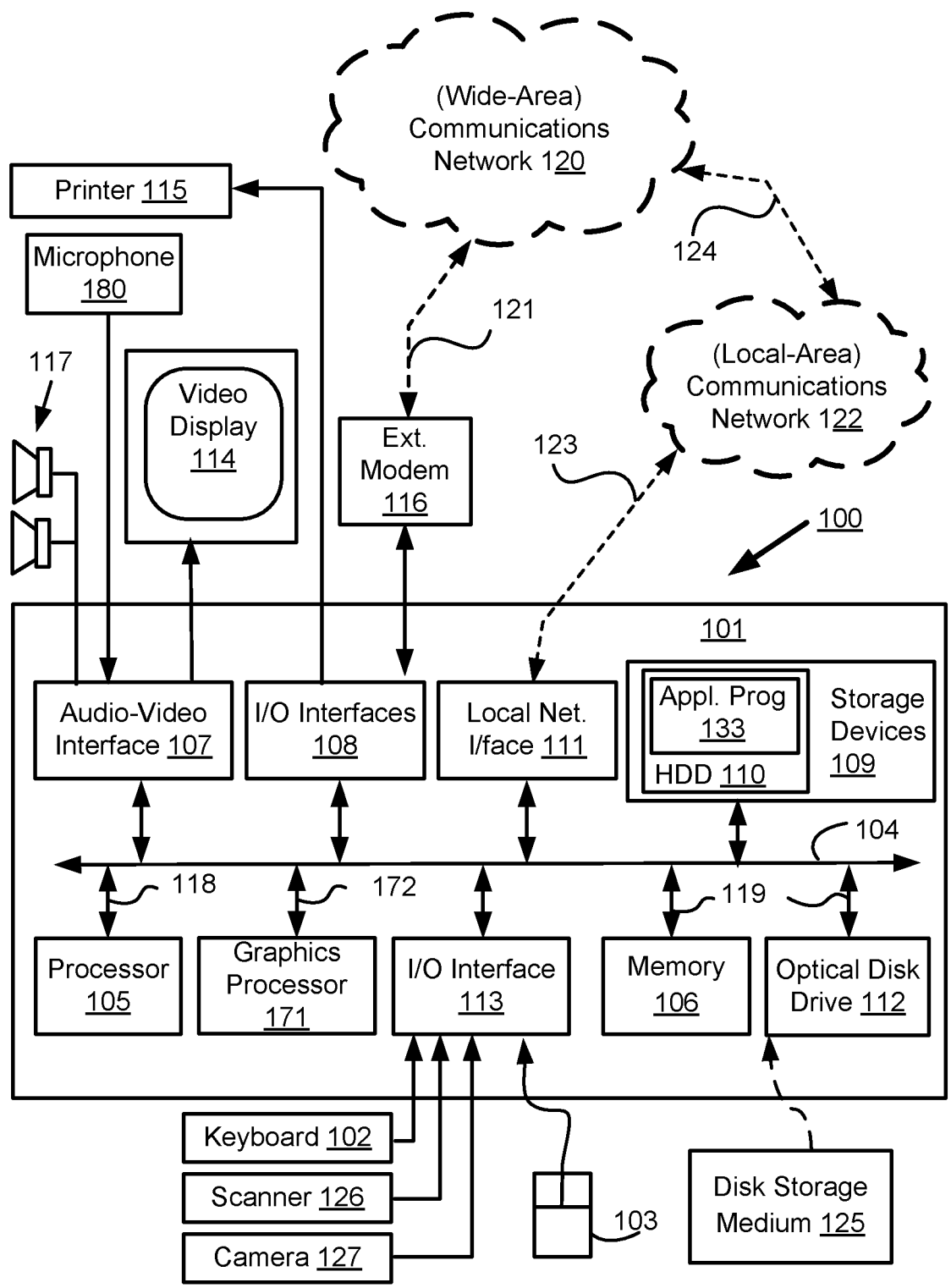
FIGS. 1 and 2 form a schematic block diagram of a general purpose computer on which described arrangements may be practised.

Where reference is made in any one or more of the accompanying drawings to steps and/or features, which have the same reference numerals, those steps and/or features have for the purposes of this description the same function(s) or operation(s), unless the contrary intention appears.

Selecting frames of a video sequence manually is more time-consuming than selecting images from a collection. A fully automatic selection method is needed to make the complete selection. Alternatively, a partially automatic selection method may be required to make the initial selection or to at least provide a filtered set of potential selections. Analysing a video sequence to select desirable frames of the video sequence is a processing intensive task. A fast and effective method of analysing a video sequence for selecting desirable frames of the video sequence is required.

Methods for selecting desirable video frames of a video sequence comprising a plurality of video frames, are described below. The methods may be implemented on a system such as a personal computer system or a mobile device with limited processing power. Systems such as these are not capable of processing every frame of a video sequence in a timely manner for frame selection. The described methods determine a subset of the video frames of a video sequence that are potentially desirable for processing enabling efficient selection of the frames for printing or display.

Figure 2:
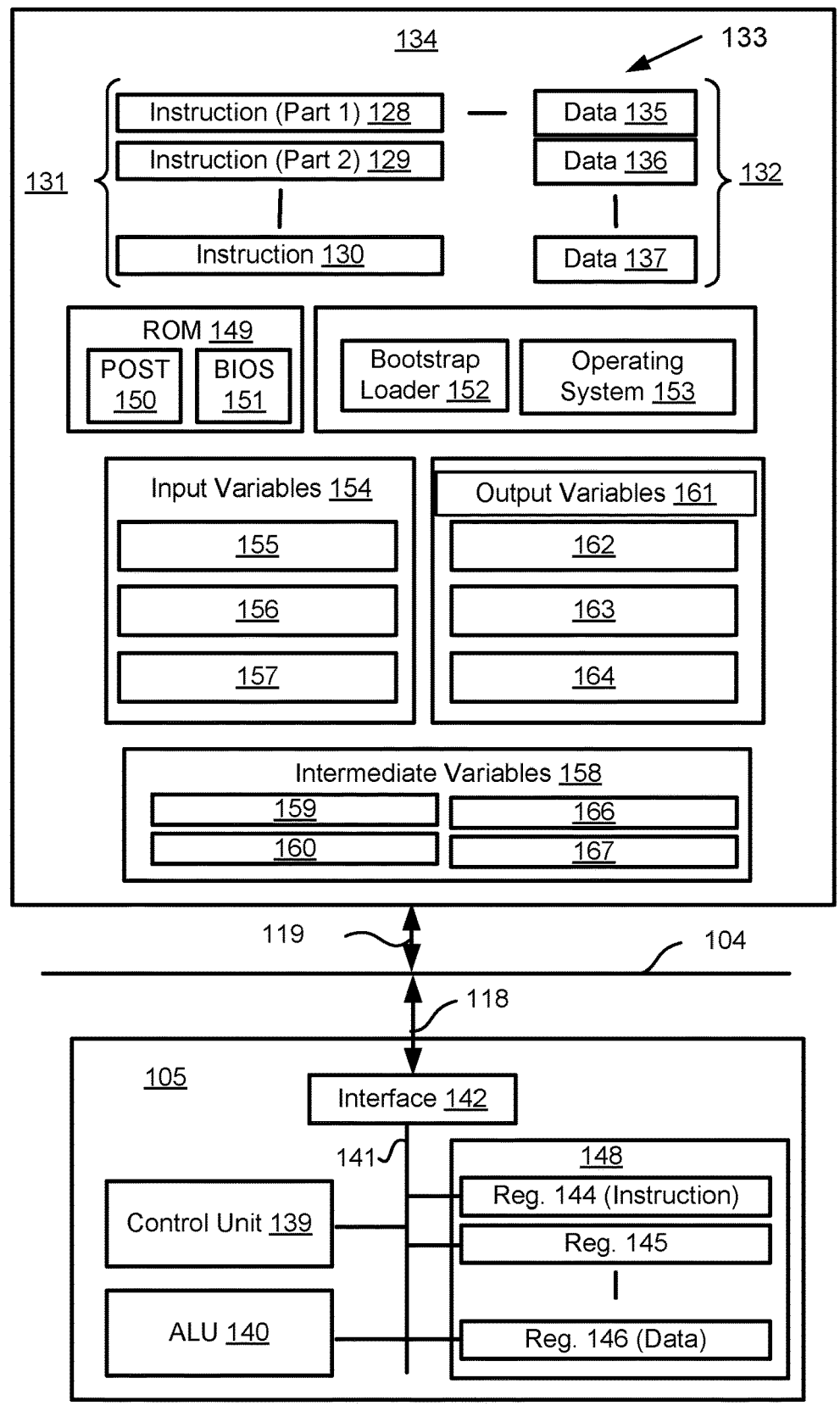

FIGS. 1 and 2 depict a general-purpose computer system 100, upon which the various arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The computer module 101 also includes a graphics processor 171 for manipulating and altering memory (e.g., the memory 106) to accelerate the creation of images. The processor 174 is coupled to the bus 104 using a connection 172.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The described methods may be implemented using the computer system 100 wherein the processes of FIGS. 3 to 10, to be described, may be implemented as one or more software application programs 133 executable within the computer system 100. In particular, the steps of the described methods are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 1 and 2 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented on a general purpose electronic device such as a mobile phone, a portable media player or a digital camera, in which processing resources are limited.

The described methods may alternatively be implemented in dedicated hardware such as one or more integrated circuits performing the functions or sub functions of described methods. Such dedicated hardware may include graphic processors, digital signal processors, or one or more microprocessors and associated memories.

Figure 3:
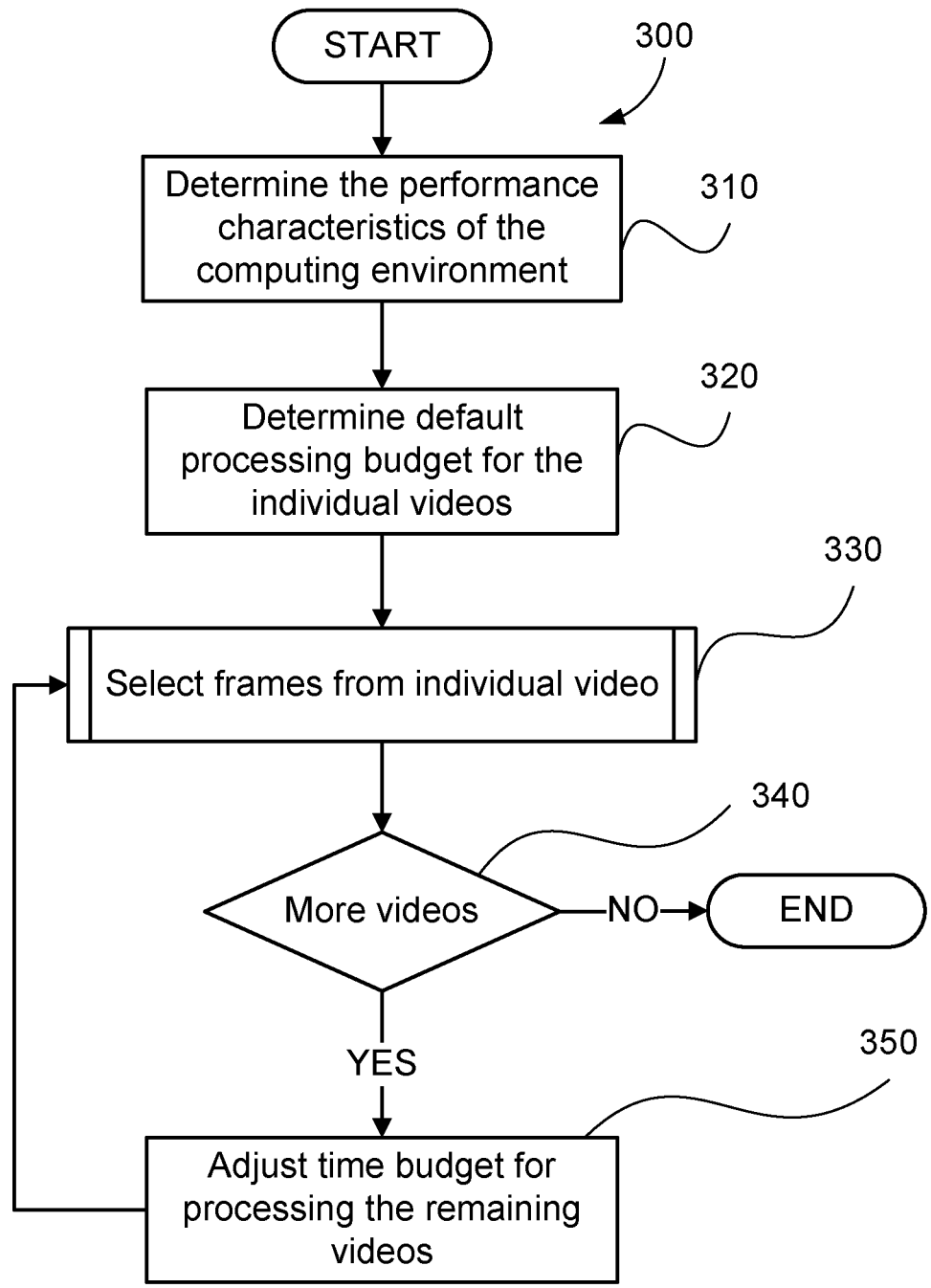
FIG. 3 is a schematic flow diagram showing a method of selecting at least one video frame of an input set of video sequences.

FIG. 3 is a flow diagram showing a method 300 of selecting at least one video frame of an input set of video sequences. The method 300 may be referred to as an automatic selection method.

In one arrangement of the method 300, a time budget is determined for processing each of the video sequences in the input set. The time budget represents a time for analysis of the video sequence. The time budget may be determined based on length of the video sequence and processing capability of a running device, such as the computer module 101. Allocating a time budget ensures that the processing is performed in a timely manner and the method 300 is responsive.

The method 300 may be implemented as one or more software code modules of the software application program 133 being resident on the hard disk drive 110 and being controlled in its execution by the processor 105.

The method 300 begins at a determining step 310, where the performance characteristics of the computer system 100 in performing the method 300 processing steps are determined under execution of the processor 105. For example, the presence of the graphics processor 171 in the system 100 may be detected at step 310. Such a graphics processor 171 increases the speed of both the decoding and quality analysis of the video sequence. The availability of the graphics processor 171 and its type as well as knowledge of the processor 105 type allows calculation of the number of sample frames that can be decoded and analysed within a particular time budget.

In an alternate arrangement, step 310 is not required, with the performance characteristics being fixed by the operating system 153. For example, some mobile devices have a fixed operating environment.

Step 310 is followed by determining step 320, where a default processing time budget is determined for the individual video sequences of the input set of video sequences, under execution of the processor 105.

The term decoding refers to producing a pixel representation of video frames (e.g., Joint Photographic Expert Group Images (JPEG)), from a compressed video file. Decoding is highly demanding on the system 100.

The term quality analysis refers to analysing a frame for image quality and content of interest. The quality elements may include but are not limited to:
  Facial features—number, position, size, relative size, crop state, blink state, gaze direction, and smile state
  Pixel features—sharpness, exposure, and colour saturation.
  Semantic features—presence of cliché scenes such as blowing out birthday candles, identifying common faces, identifying pets, identifying relationships.

Using the quality elements described above, image quality may be determined based on at least one of: facial recognition, facial expression recognition, blink recognition, gaze direction, sharpness, exposure, colour saturation, presence of clichés, identification of particular people, identification of pets, and identification of relationships Quality analysis is highly demanding on the system 100. The output of the analysis is a quality "score" or a set of quality scores derived from the combination of the quality elements listed previously. In one example, weights may be assigned to each quality element to arrive at a quality score.

As described here, sampled frames are defined as the decoded frames that have been analysed for quality.

Returning to step 320, the processing budget defines how long the method 300 will take to execute. A combined processing budget over all the video sequences can be set by a particular system goal. Examples of system goals may include, for example:
  method 300 must complete in five (5) minutes; and
  method 300 must complete in one tenth of the combined video duration.

The time constraint for the method 300 can be apportioned to the individual video sequences. In one arrangement, the time constraint may be assigned proportionally to the individual video sequences based on the video length. Alternatively, a minimum number of sample frames in each of the video sequences may be required and then the remainder sample frames may be assigned proportionally to the video sequences.

As described above, decoding frames and quality analysis are highly demanding on a processing system such as the system 100. In one arrangement, the processing budget that is imposed on the individual video sequences may be set to a maximum number of frames that will be sampled in the video sequences. In an alternate arrangement, the processing budget may be set to the maximum number of frames to be sampled and the maximum number of frames to be decoded in the video sequence. There may be other constraints imposed on video sequence processing which may include items such as maximum number of non I-frames, such as P (forward predicted) and B (bi-directionally predicted) inter frames, that are decoded.

Step 320 is followed by selecting step 330, where at least one frame from an individual video sequence is selected, under execution of the processor 105. The input to step 320 is a processing budget and the video sequence from which desirable frames are to be selected. A method 400 of selecting at least one video frame of a video sequence, as executed at step 330, will be described in detail below with reference to FIG. 4.

At decision 340, if there are remaining video sequences to be processed, then the method 300 proceeds to step 350. Otherwise, the method 300 concludes.

In one arrangement, after processing an individual video sequence at step 330, at adjusting step 350, the remaining budget is re-evaluated based on the over or under use of the processing budget assigned at step 330. The same methods executed at step 320 may also be applied at step 350.

Figure 4:
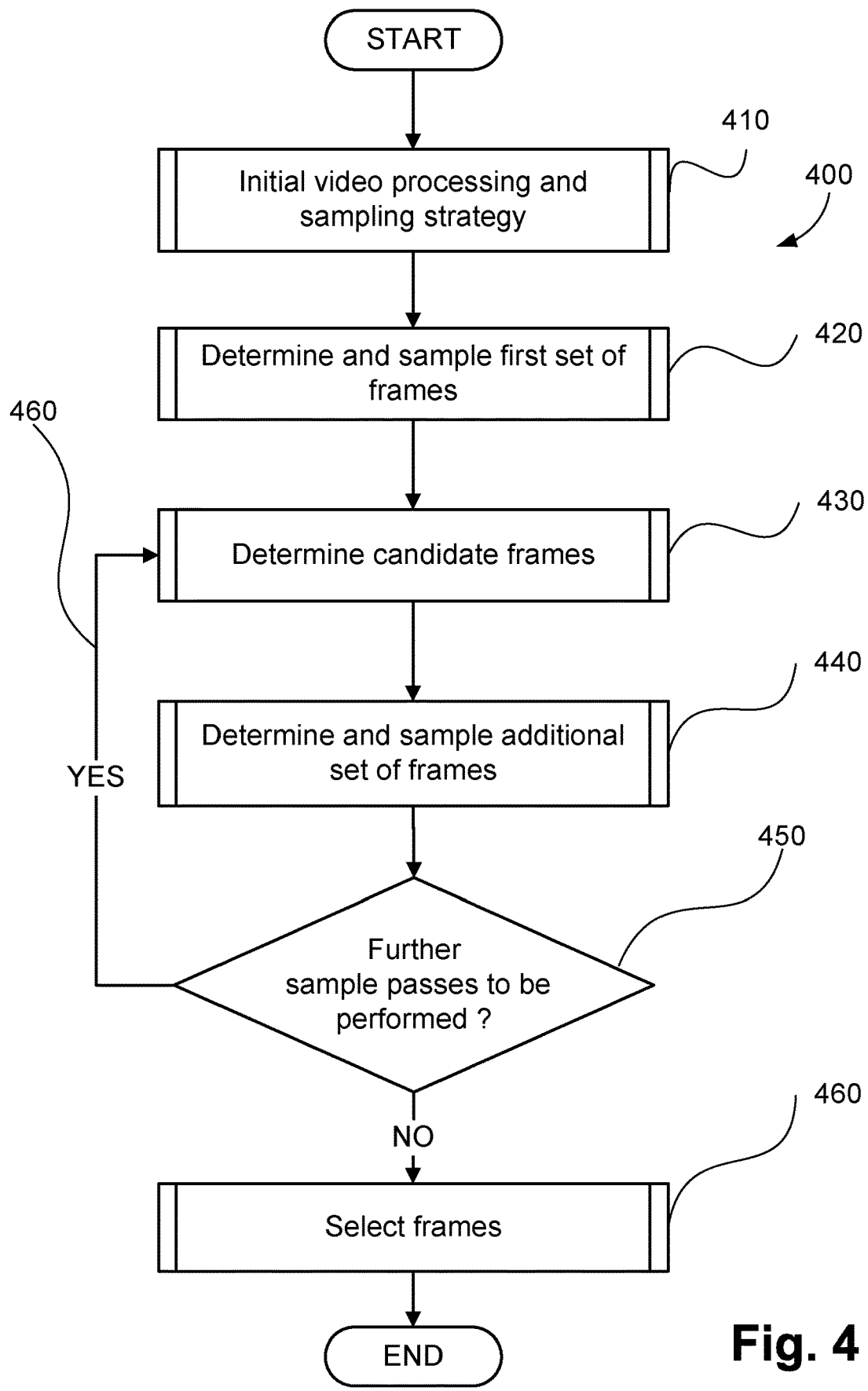
FIG. 4 is a schematic flow diagram showing a method of selecting at least one video frame of a video sequence.

Having described the method 300 of selecting at least one video frame of an input set of video sequences, the method 400 of selecting at least one video frame of an input video sequence as executed at step 330 will now described in detail with reference to FIG. 4.

The method 400 may be implemented as one or more software code modules of the software application program 133 being resident on the hard disk drive 110 and being controlled in its execution by the processor 105.

The method 400 selects samples of the video frames of the video sequence in two or more passes (multi-pass sampling) and selects most desirable frames from the sampled frames for printing or display.

Existing methods make use of sampled frames using a sampling pattern determined by activity which is derived from, for example, inter-frame colour differences. The method 400 provides a targeted method for selecting samples of video frames, which is both more efficient and more effective in identifying potential selectable sample frames than existing methods.

The method 400 is provided with a processing budget as described previously in relation to step 320.

At processing step 410, the processing budget is used to determine an initial processing and frame sampling strategy, under execution of the processor 105. The initial processing and frame sampling strategy may be stored in the memory 106.

The frame sampling strategy may be determined at step 410 using sub-steps of: decoding video frames of the video sequence; determining static and dynamic segments of the video sequence for deciding frame sampling density to be used in the corresponding type of segment; and determining the amount of sampling to take place in successive passes of the video sequence. Segmenting of the video sequence into static and dynamic portions may occur at step 410 under execution of the processor 105. Determination of the static and dynamic portions of the video sequence may be based on amount of colour difference between frames at a time period apart, as described below. A method 500 of determining an initial video processing and sampling strategy for the video sequence, as executed at step 410, will be described in detail below with reference to FIG. 5.

The initial step 410 is followed by a step of performing a first pass sampling step 420. At step 420, a first sampling pattern is determined, under execution of the processor 105, based on the processing budget for analysis determined at step 410. Frames of the video sequence to sample are determined at step 420 based on considerations including sampling densities provided at step 410. The frames determined at step 420 form a first set of frames which are sampled using the determined first sampling pattern. The frames may be sampled infrequently throughout the video sequence in accordance with the first sampling pattern. Further, sampling of frames may be more frequent in dynamic portions of the video sequence and less frequent in static portions of the video sequence.

Also at step 410, quality analysis is performed on the frames determined at step 410. A method 600 of determining frames and performing quality analysis, as executed at step 410, will be described in detail below with reference to FIG. 6.

Step 420 is followed by a determining step 430, where candidate frames of the video sequence are determined, under execution of the processor 105, from the frames sampled at step 420. A candidate frame is a sampled frame of sufficient high quality. A candidate frame is an indicator used to select nearby frames of the video sequence for sampling in subsequent sampling passes of the video sequence due to the potential of even higher quality of nearby frames. The candidate frames are determined at step 430 based on image quality. Step 430 provides a high advantage over other conventional methods by using previous pass samples to predict the frames that are most likely to be selectable and so worthy of sampling in a next pass. As the sampling is targeted at where there is a higher potential of higher quality frames, fewer frames need to be sampled to determine a pool of sufficient size and quality to take the selections from. As a result, processing is more efficient and takes less time than alternate methods.

Considerations in determining the candidate frames include: the number of sample frames to be allocated in a current pass; quality score of the sampled frame; requirement for diversity in the sample frames. A method 700 of determining candidate frames, as executed at step 430, will be described in more detail below with reference to FIG. 7.

Step 430 is followed by a next pass sampling step 440, where another set (e.g., a second set) of sample frames is determined and analysed in accordance with a second sampling pattern. The set of frames determined at step 440 comprise one or more frames in a narrow range of the video sequence near a determined candidate frame. The sample frames selected at step 440 are close to the candidate frames determined at step 430. The second sampling pattern is based on similarity of nearby frames in the video sequence compared to the candidate frame.

Frames that have a high similarity to a corresponding candidate frame can be omitted as sample frames at step 430. At step 430, additional frames may be decoded to be used as sample frames at step 440. After a sample frame is selected at step 430 quality analysis is performed on the selected sample frame. A method 800 of analysing sample frames, as executed at step 440, is described in more detail below with reference to FIG. 8.

Step 440 is followed by decision step 450, where if further sample passes are to be performed, then the method 400 proceeds to step 430. Otherwise, the method 400 proceeds to step 460. The number of sample passes performed in the method 400 can be specified by the sampling strategy output at step 410. If, for example, only two passes are specified then the decision made at step 450 will be NO then the method 400 proceeds to selecting step 460. Otherwise, if more than two passes are specified then the method 400 returns to step 430 to repeat steps 430 and 440.

In an alternate arrangement, if there remains some processing time left in the processing budget, determined at step 410, for analysis then steps 430 and 440 will be repeated even if the number of passes exceeds that set by the sampling strategy output at step 410.

At selecting step 460, at least one of the video frames of the set of frames determined at step 440 or step 420 are selected for printing or display based on image quality, under execution of the processor 105. The frames for printing or display are selected at step 460 from high quality sample frames. The selection is made at step 460 from the sampled frames with a high image quality score. A frame may have been sampled using a first sampling pattern in step 420 or a second sampling pattern in step 440. The selection is not concerned with which sampling pattern is used as long as a sampled frame has a high image quality score. For example, a high image quality frame may be sampled at step 420 and the frames sampled subsequently at step 440 have a lower image quality. In such an example, a frame sampled at step 420 will be selected at step 460.

Near duplicate frames are not considered at step 460 and diversity is provided by selecting sample frames from different segments of the video sequence. A method 900 of selecting frames for printing or display, as executed at step 460, will be described in detail below with reference to FIG. 9.

Figure 5:
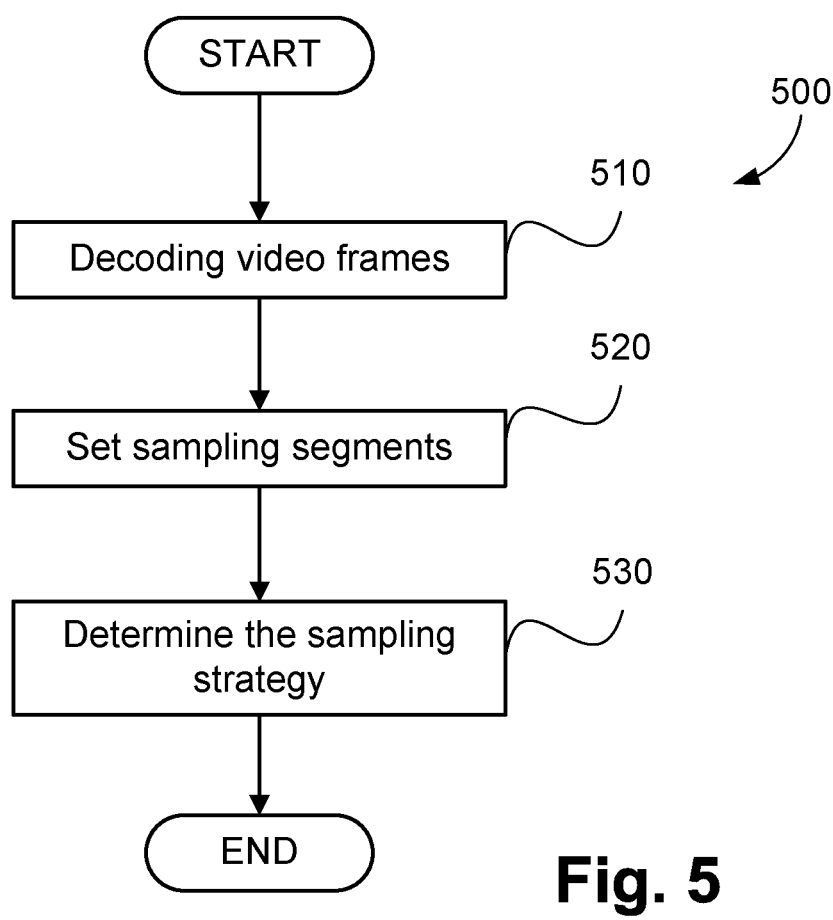
FIG. 5 is a schematic flow diagram showing a method of determining an initial video processing and sampling strategy as used in the method of FIG. 4.

Having described the method 400 for selecting at least one video frame (e.g., a desirable video segment or frame) from an input video sequence, the method 500 of determining the initial video processing and sampling strategy as executed at step 410 will now be described in detail with reference to FIG. 5.

The method 500 may be implemented as one or more software code modules of the software application program 133 being resident on the hard disk drive 110 and being controlled in its execution by the processor 105.

As described above, the input to step 320 is the processing budget and the video sequence from which desirable frames are to be selected. The method 500 is provided with a processing budget as at step 320. The processing budget used at step 320 is defined as an estimated maximum number of frames to be sampled. Alternatively, the processing budget may be defined as both the maximum number of frames to be sampled and the maximum number of frames to be decoded.

The method 500 begins at decoding step 510, where video frames of the input video sequence are decoded, under execution of the processor 105. The system 100 may comprise an application programming interface (API) for use in decoding the video frames of the input video sequence. Any suitable API may be used to decode the video frames. Other environments such as mobile devices may comprise decoders for use in decoding the video frames. Alternatively decoders may be downloaded, for example, over the network 120. An example decoder may be the FFmpeg library.

In one arrangement, each decoded frame determined at step 510 is a JPEG file or an image file of alternate type including gif, tiff. In an alternate arrangement, the output of step 510 may be a bitmap image held in the memory 110.

As described above, a video sequence of ten (10) minute length typically has eighteen (18) thousand frames. Decoding is a processor intensive task and so decoding all frames may not be possible unless the total video sequence time is short. So typically a subset of the frames will be decoded. In one efficient arrangement, the method 500 decodes only the I-frames of the video sequence. I-frames are created as part of video compression. In compression, fully specified frames are followed by a number of frames that are specified as "deltas" from the fully specified frames. The fully specified frames are the I-frames. Since I-frames are fully specified, the I-frames are more efficient to decode to determine the frame image and the images tend to have fewer compression artefacts. It is common for I-frames to occur once every second of video.

In one arrangement of the described methods, in the first sampling pattern only I-frames are sampled. Decoding only I-frames reduces the number of frames that need to be processed as well as being the most efficient method of decoding that number of distributed frames. At step 510, all frames of the video sequence, I-frames or a combination of I-frames and non I-frames may be decoded.

As described previously in relation to step 320, in an alternate arrangement, the processing budget includes the specification of the maximum number of frames to be decoded in which case the maximum number of frames would be applied in step 510.

In an alternate arrangement of step 510, frames may not be decoded to JPEG or other image formats. In such an alternate arrangement, the decoding can output motion vectors which may be used to determine the activity in the video sequence. The motion vectors may be input to step 520. In the alternate arrangement, where motion vectors are determined at step 510, decoding of the image frames to JPEG or other image format is required in step 420 and the method 600.

In one arrangement, detected activity within the video sequence is used to shape the sampling pattern. More sample frames may be determined from parts of the video sequence with higher activity (dynamic segments) and less sample frames from parts of the video sequence with little activity (static segments). Having a higher sample density in dynamic segments has a number of advantages as follows:

The frames in dynamic segments are more likely to have defects that include motion blur and badly composed content. More sample frames mean that there is more likelihood of alternate sample frames being available for defect sample frames.

There is a larger variety of content and so higher density ensures coverage of the different content of the video sequence.

Interesting content such as moving subjects results in high video activity, which is another advantageous reason for selecting a higher density of samples from dynamic segments.

The method 500 continues at the next step 520, where sampling segments are set under execution of the processor 105. One method for determining activity in video sequences is by comparing colour differences between adjacent decoded frames. Differences in colour histograms may be determined as such differences provide a good indication of similarity of video frames. A high density of dissimilar adjacent decoded frames indicates high activity. A high density of dissimilar adjacent decoded frames may be used to determine dynamic and static segments.

In an alternate arrangement, high activity may be indicated by the presence of many motion vectors with a relatively large magnitude. Known methods such as Scale Invariant Feature Transform (SIFT) can also be used to determine the degree of similarity between adjacent decoded frames and so can be used to detect activity.

In an alternate arrangement of the described methods, the activity in the video sequence is not used to influence the density of sampling and step 520 is jumped. The samples in such an alternate case may be allocated evenly throughout the video sequence.

The method 500 continues at the next step 530, where the sampling strategy is determined by defining the parameters for multi-pass sampling. The total number of samples was set at step 320. The parameters that are set at step 530 are the number of sampling passes and the number of frames to be sampled at each pass. For example, one sampling strategy is to have two passes and allocate 75% of the sample frames in the first pass leaving 25% of the sample frames for the second pass. A second strategy that may be effective if there is an expectation that there will be a relatively high proportion of low quality frames is to allocate more passes. For example, three (3) passes may be used with 60% of the sample frames allocated in the first pass, 30% of the sample frames for the second pass and 10% of the sample pass for the last pass.

Figure 6:
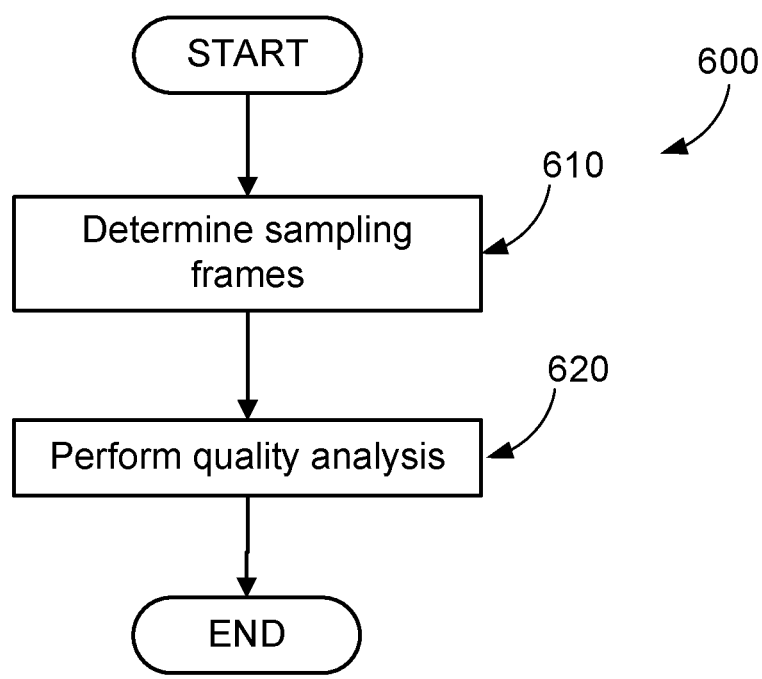
FIG. 6 is a schematic flow diagram showing a method of determining a list of frames and performing quality analysis, as used in the method of FIG. 4.

The method 600 of determining frames and performing quality analysis, as executed at step 410, will now be described in detail below with reference to FIG. 6. The method 500 determines the first set of sample frames.

The method 600 may be implemented as one or more software code modules of the software application program 133 being resident on the hard disk drive 110 and being controlled in its execution by the processor 105.

The method 600 begins at determining step 610, where the frames of the video sequence to be sampled are determined. The number of sample frames to be allocated in the first pass was determined at step 530 and the sample frames are to be distributed amongst the segments set at step 520. The sampled frames may be distributed amongst the segments based on length and type of the video segment. As described previously with respect to step 520 it is advantageous to allocate proportionally more sample frames in dynamic segments than static segments. In one arrangement, relative allocation of sample frames is expressed as a "dynamic to static sample density ratio", $R_{ds}$ which will be greater than (>) one (1) and is defined to be the relative density of samples in dynamic segments to samples in static segments. As an example, if $R_{ds}=2$ then if a dynamic and static segment both have the same number of frames then the dynamic segment will be allocated twice the number of sample frames than the static segment.

Figure 10A:
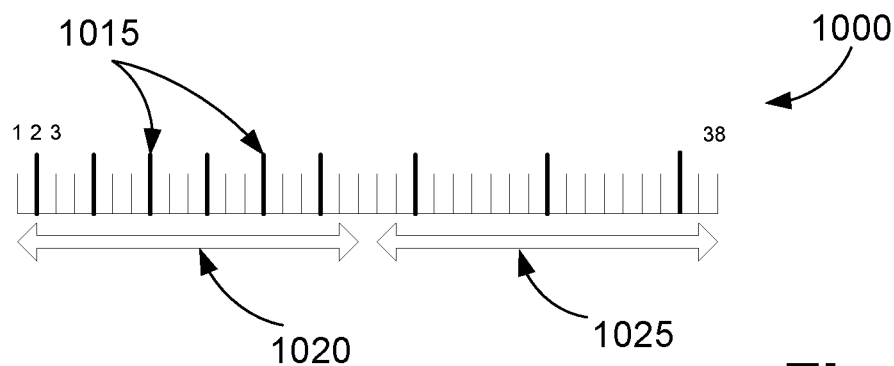
FIG. 10A shows a sequence of thirty eight (38) decoded frames split into two segments.

FIG. 10A shows a sequence of thirty eight (38) decoded frames 1000 split into two segments, a dynamic segment 1020 and a static segment 1025. Both segments 1020 and 1025 have the same number of frames (i.e., nineteen (19) frames). The nine darker and longer marked frames 1015 are the sampled frames. The dynamic segment 1020 has twice the number of frames than the static segment 1025 and the samples are evenly spaced within the segments.

The number of samples, $N_d$, to be allocated over all dynamic segments may be determined in accordance Equation (1), as follows:

$$N_d = T_d \times R_{ds} \times N/(T_s + (T_d \times R_{ds})) \quad (1)$$

where:
$N_d$ is the number of samples to be allocated over all dynamic segments
$T_d$ is the total number of frames over all dynamic segments
$R_{ds}$ is the dynamic to static sample density ratio described earlier
$N$ is the total number of samples to be split between dynamic and static segments
$T_s$ is the total number of frames over all static segments The number of samples, $N_s$, allocated over all static segments may be determined in accordance with Equation (2), as follows:

$$N_s = N - N_d \quad (2)$$

where:
$N_s$ is the number of samples allocated over all static segments.

The number of samples to be allocated in a particular dynamic segment, $NP_d$, is determined based on Equation (3), as follows:

$$NP_d = P_d \times N_d T_d \quad (3)$$

where:
$NP_d$ is the number of samples to be allocated in a particular dynamic segment
$P_d$ is the number of frames in the particular dynamic segment A similar formula to Equation (3) may be applied to determine the number of samples in a static segment.

Variations to the above Equations (1), (2) and (3) may be made to ensure that at least one sample occurs in each of the segments. Other variations are also possible.

In one arrangement, the sampled frames are spread evenly within the segment. For example, as shown in FIG. 10A, the six samples in segment 1020 are evenly spaced and the three samples in segment 1025 are evenly spaced. In an alternative arrangement, cluster samples around the parts of the segments with higher activity frames may be used.

After step 610, quality analysis is performed on the sample frames determined at step 610 at analysis step 620. The elements of quality analysis has been described above and include but are not restricted to face features such as position with alignment to the rule of thirds, similar size faces, non-cropped faces, presence of smile all of which would contribute to a high quality frame. The face features can be provided by a number of face detection libraries. Any suitable face detection library may be used at step 620.

Pixel derived features that include but are not restricted to sharpness, exposure, contrast and colour saturation all can be measured at step 620 to ensure that the frame has no defect. Any suitable algorithm may be used at step 620 to make such measurements. In addition, semantic features such as presence of clichés, and the identification of relationships can be used to determine the quality of a frame.

The features of the sampled frames determined at step 620, or subsets of the determined features, may be combined to arrive at a single quality score.

Figure 7:
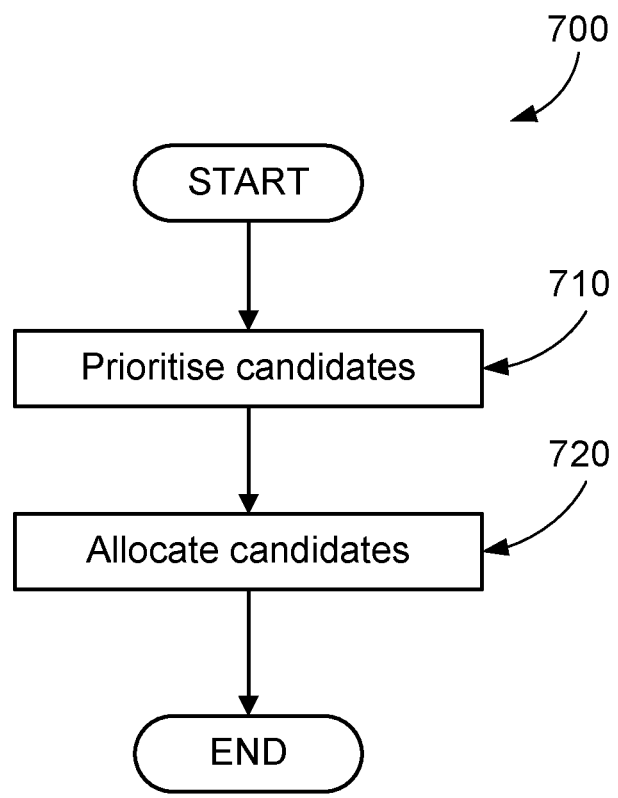
FIG. 7 is a schematic flow diagram showing a method of determining candidate frames as used in the method of FIG. 4.

The method 700 of determining candidate frames, as executed at step 430, will now be described in detail with reference to FIG. 7. The frames that have been sampled in the method 600 have an assigned quality score. The samples with the higher quality scores determine the frames that will be sampled in the next pass. By targeting frames close to the samples with high quality scores, good frames tend to be clustered together. Features including under-exposure due to low-light and low contrast due to an uninteresting scene can be present for multi-second periods until the next scene is captured. If such features are detected in a sampled frame then it is better not to sample close to that frame in the next pass.

The method 700 may be implemented as one or more software code modules of the software application program 133 being resident on the hard disk drive 110 and being controlled in its execution by the processor 105.

The method 700 begins at prioritising step 710, where the sample frames determined at step 420 are prioritised based on the quality score associated with each frame, under execution of the processor 105. The prioritised frames may be stored in the memory 106. The sample frames determined at step 420 may be prioritised by ordering the sample frames within a segment from highest quality down based on a single quality score. Alternatively, diversity can be considered when prioritising the sample frames.

One method of ensuring diversity within segments is by not considering sample frames that have a high similarity to higher scoring sample frames. Another method of ensuring diversity within segments is to consider time difference together with the quality score to prioritise samples that are far apart in time.

Figure 10B:
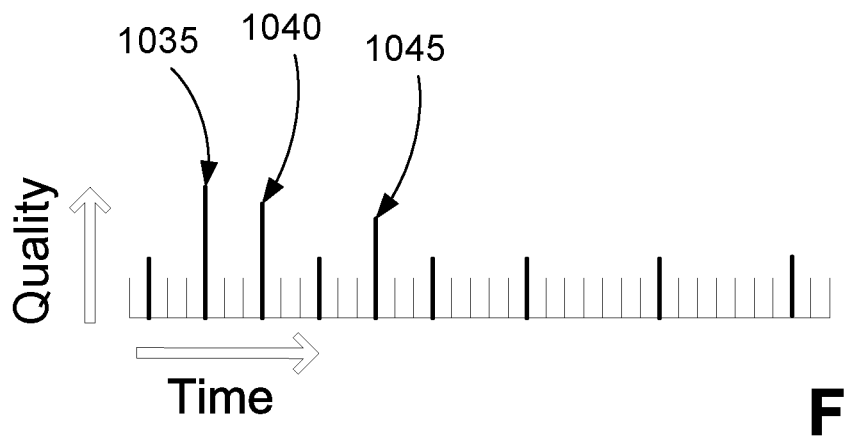
FIG. 10B shows three sample frames with sufficient quality to be considered as potential candidate frames.

FIG. 10B shows three sample frames 1035, 1040 and 1045 with sufficient quality to be considered as potential candidate frames. Although sample frame 1040 has a higher quality than sample frame 1045 when a weighting due to the time difference of the two to the highest quality sample 1035 include in the calculation, then sample frame 1045 may be a preferred candidate than sample frame 1040.

At allocating step 720, the "candidate frames" that are defined to be the sampled frames whose neighbours will be selected in the next sampling pass are allocated. The number of sample frames to be processed in the next pass has been determined in accordance with the method 500. As described in relation to step 520 the sample frames can be allocated to the different segments according to the Equations (1), (2) and (3).

Figure 10C:
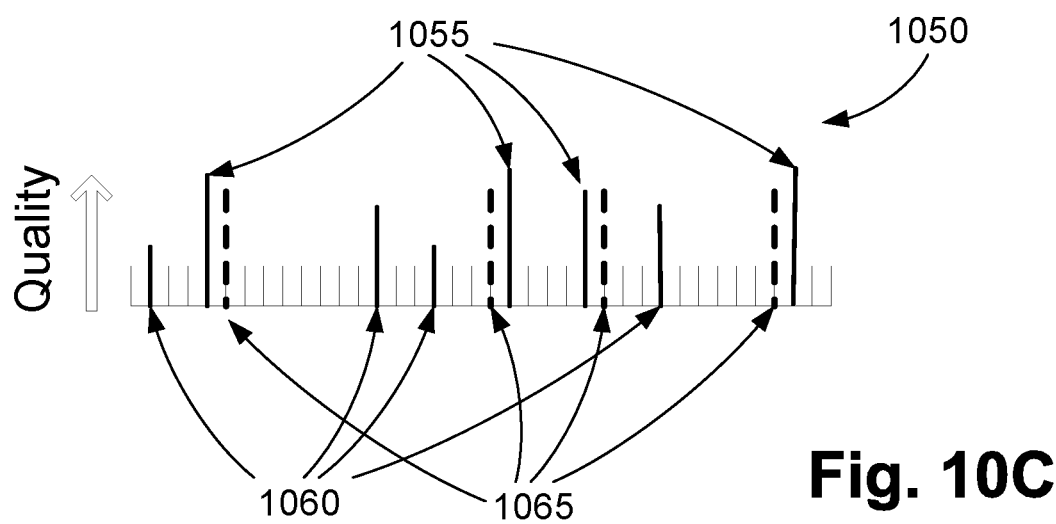
FIG. 10C shows an example where the number of sample frames to be analysed has been set as four.

In one arrangement, the same set of Equations (1), (2) and (3) are used to determine how many candidate frames will be in each of the segments. In one arrangement, each of the candidate frames relate to a single sample. The scores that are determined in step 710 are used to select the top N candidate frames where N is the number of sample frames to be analysed in the next pass as determined by method 500. This is shown in FIG. 10C where the number of sample frames to be analysed has been set as four so the four highest quality sample frames shown as 1055 are selected as the candidate frames.

Figure 8:
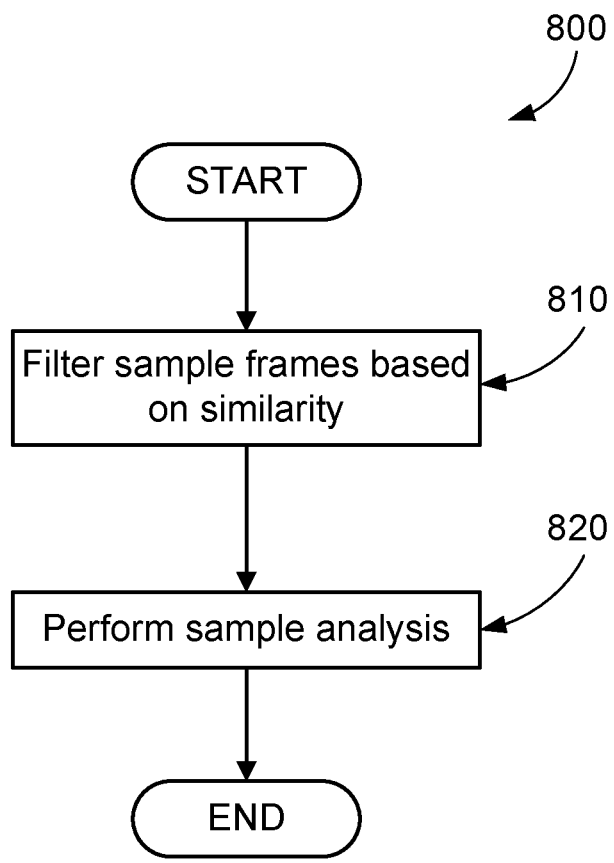
FIG. 8 is a schematic flow diagram showing a method of analysing sample frames, as used in the method of FIG. 4.

In an alternate arrangement, the number of candidate frames can exceed the number of sample frames to be obtained in a pass with a filtering to occur as a later step in method 800 of FIG. 8 to reduce the number of sample frames to a required number.

In a segment, it is possible that no sample frame has a sufficient quality score to qualify as a candidate frame. In one arrangement, where no sample frame has a sufficient quality score to qualify as a candidate frame, no candidate frames are allocated at step 720 and so no samples will be selected in the next pass of the method 400. In another arrangement, a reduced number of candidate frames may be allocated at step 720 using sample frames allocated at random positions within a segment.

The method 800 of analysing sample frames, as executed at step 440, will now be described in detail with reference to FIG. 8.

The method 800 may be implemented as one or more software code modules of the software application program 133 being resident on the hard disk drive 110 and being controlled in its execution by the processor 105.

The method 800 begins at filtering step 810, where the frames determined at step 430 are filtered to determine which of the frames neighbouring a candidate frame will be selected as the sample frame to be analysed. In one arrangement, the frames neighbouring a candidate frame are considered with the frame that is selected for sampling being the frame that is most dissimilar to the candidate frame. For example, FIG. 10C shows frames to be sampled 1065, where the frames 1065 are the neighbouring frames of the candidate frames 1055 that have a highest dissimilarity to the candidate frames 1055.

In an alternate arrangement, neighbouring frames that have a similarity to a candidate frame that exceeds some threshold will not be selected as a sample frame. If no immediate neighbouring frame is sufficiently dissimilar to the candidate frame then the neighbouring frames of frames neighbouring the candidate frame are considered. The process is then repeated up to a maximum time distance from the candidate frame. In a further arrangement, a neighbouring frame is selected at random from the maximum of two neighbouring frames with no consideration of similarity.

The method 800 completes at analysing step 820, where analysis is performed on the frame selected at step 810 in a similar manner to step 620 which has been described previously.

Figure 9:
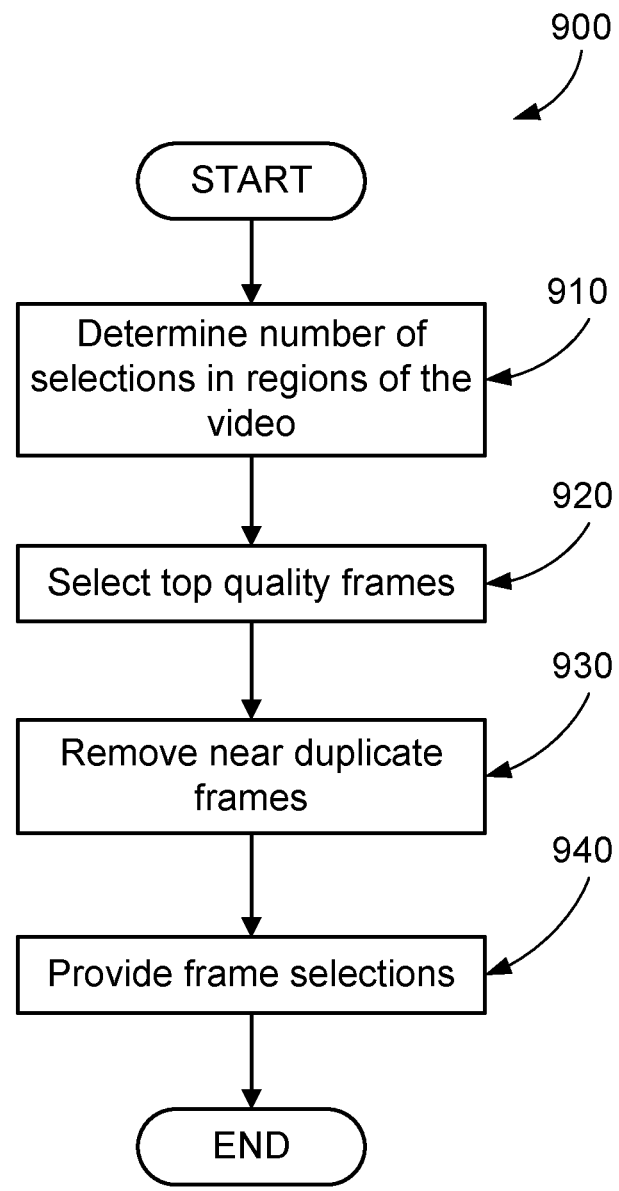
FIG. 9 is a schematic flow diagram showing a method of selecting a frame as used in the method of FIG. 4.

The method 900 of selecting frames for printing or display, as executed at step 460, will now be described in detail with reference to FIG. 9. The method 900 may be implemented as one or more software code modules of the software application program 133 being resident on the hard disk drive 110 and being controlled in its execution by the processor 105.

The method 900 is executed at step 460 after all decoding and analysis has taken place. The frame selected in accordance with the method 900 may be used for display (e.g., on the display 114) or for use as content in printed books.

The method 900 begins at determining step 910, where the number of frames to be selected in the video sequence is determined under execution of the processor 105 and stored in the memory 106. The number of frames to be selected may be dictated by the destination of the selected frames. For example, a photo book may have a maximum and minimum limit on the number of frames to go into the photo book. A system, such as the system 100, may also set the number of frames to be sampled over all the video sequences to exceed the maximum number of images that will be put into the photo book. Step 910 will ensure diversity by selecting from each video segment where possible. The number of frames to be selected may be stored in the memory 106.

In one arrangement, the determined number of frames to be selected is based on the length and type of the video portion. For example, the method may involve determining a number of frames to be selected in different portions of the video sequence. Usefully, a larger number of frames can be determined for a longer portion of the video than for a shorter portion of the video. Also, in an arrangement where the static and dynamic segments of the video have been determined, more frames can be determined for a dynamic portion than for a static portion of the video sequence.

At the next selecting step 920, the sampled frames in the video sequence with the highest quality score are selected, under execution of the processor 105. Alternatively, the selection can be made from the second set or any subsequent set of sampled frames. Then at filtering step 930, near duplicate ones of the frames selected at step 920 are removed.

The method 900 concludes at providing step 940, where the frames selected at step 920, excluding the frames removed at step 930, are provided. The provided frames may be stored in the memory 106. The selected frames may be provided as frame image files such as JPEG files or any other suitable image format. Alternatively, the frame number or frame timestamp of the selected frames may be provided.

The described methods may provide an efficiency advantage for sampling frames from video sequences. By concentrating sampling footage with a higher quality score, there is a greater chance of finding desirable frames. Also, by sampling less frames around frames with a lower quality score, there is less time budget spent on parts of video footage where there is less chance of finding a desirable frame.

The sampling patterns determined in accordance with the described methods are configured to match the distribution of desirable frames in typical video sequences, as desirable frames tend to be clustered at very few and relatively short portions of a video sequence.

When compared to a conventional method of sampling, such as selecting frames at periodic intervals, the method 400 performs better both in speed and accuracy. An experiment conducted to compare performance of the method 400 and a periodic sampling method that sampled one frame for every three seconds of footage, found that the method 400 was on average 22% faster than the periodic sampling method. The experiment also found that the method 400 was between two to three times more accurate in terms of precision and recall for selecting desirable frames depending on the duration of a video sequence.

The experiment also showed that the accuracy advantage of the method 400 tends to be even greater for longer video sequences. The accuracy advantage of the method 400 may be greater for longer video sequences since there tends to be fewer desirable frames for the same amount of video footage in longer video sequences than for shorter video sequences. Using longer footage can cause the periodic sampling method to select many more undesirable frames thus lowering the accuracy. Whereas analysing a longer video sequence has less impact on accuracy of the method 400 due to the use of the sampling patterns of the described arrangements.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method, performed by at least one processor which executes a program stored in a storage, of selecting at least one video frame of a video sequence comprising a plurality of video frames, said method comprising:
   determining a sampling pattern based on length of the video sequence and processing capability of a running device including the at least one processor;
   sampling a first set of said frames which are not continuous in the video sequence, wherein the frames of the first set are sampled throughout the video sequence in accordance with the first determined sampling pattern;
   determining candidate frames from the sampled frames based on image quality;
   sampling a second set of neighboring frames of the determined candidate frames, in accordance with similarity between each of the neighboring frames and each of the candidate frames; and
   selecting at least one of the video frames from the first set of said frames and the second set of neighboring frames based on image quality,
   wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

2. The method according to claim 1, wherein image quality is determined based on at least one of: facial recognition, facial expression recognition, blink recognition, gaze direction, sharpness, exposure, colour saturation, presence of cliché s, identification of particular people, identification of pets, and identification of relationships.

3. The method according to claim 1, further comprising segmenting the video sequence into static and dynamic portions.

4. The method according to claim 3, wherein sampling of frames is more frequent in dynamic portions of the video sequence and less frequent in static portions of the video sequence.

5. The method according to claim 3, wherein determination of the static and dynamic portions is based on amount of colour difference between frames at a time period apart.

6. The method according to claim 1, wherein the first sampling pattern comprises sampling I-frames.

7. The method according to claim 1, further comprising selecting the number of video frames from the sampled frames according to a determined number of frames for each video portion based at least one of: length and type of the video portion.

8. The method according to claim 1, further comprising:
   determining a time for analysis based on the length of the video sequence and the processing capability of the running device,
   wherein the first sampling pattern is determined based on the determined time for analysis.

9. The method according to claim 8, wherein the time for analysis is determined, such that the selecting of the at least one of the video frames is completed in a predetermined time.

10. The method according to claim 8, further comprising determining if there is time left for further analysis.

11. The method according to claim 10, wherein, where there is time for further analysis, the method further comprises:
    determining a further candidate frame from the sampled frames based on the image quality, and
    sampling one or more neighboring frames of the further candidate frame.

12. The method according to claim 11, further comprising adjusting time for further analysis based on over or under use of the determined time,
    wherein the further candidate frame is determined based on the adjusted time.

13. The method according to claim 1, wherein a number of the first set of said frames to be sampled is determined based on the length of the video sequence and the processing capability of the running device, and the sampling pattern is determined based on the determined number.

14. The method according to claim 1, wherein the at least one of the video frames is selected for display or printing.

15. The method according to claim 14, wherein the at least one of the video frames is selected for use as a content in printed book.

16. The method according to claim 1, wherein the processing capability is determined based on a type of the at least one processor.

17. The method according to claim 1, wherein the processing capability is determined based on presence, in the running device, of a graphic processor which increases speed of decoding or quality analysis of the video sequence.

18. The method according to claim 1, wherein the processing capability is determined based on availability or a type of a graphic processor, in the running device, which increases speed of decoding or quality analysis of the video sequence.

19. An apparatus for selecting at least one video frame of a video sequence comprising a plurality of video frames, said apparatus comprising:
    a storage storing a program;
    at least one processor that executes the program stored in the storage,
    wherein the at least one process executes:
    determining a sampling pattern based on length of the video sequence and processing capability of the apparatus;
    sampling a first set of said frames which are not continuous in the video sequence, wherein the frames of the first set are sampled throughout the video sequence in accordance with the determined sampling pattern;
    determining candidate frames from the sampled frames based on image quality;
    sampling a second set of neighboring frames of the determined candidate frame, in accordance with similarity between each of the neighboring frames and each of the candidate frames; and
    selecting at least one of the video frames from the first set of said frames and the second set of neighboring frames based on image quality,
    wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

20. A non-transitory computer readable medium having a computer program stored on the medium for at least one processor to perform a method for selecting at least one video frame of a video sequence comprising a plurality of video frames, said method comprising:
   determining a sample pattern based on length of the video sequence and processing capability of a running device including the at least one processor;
   sampling a first set of said frames which are not continuous in the video sequence, wherein the frames of the first set are sampled throughout the video sequence in accordance with the determined sampling pattern;
   determining candidate frames from the sampled frames based on image quality;
   sampling a second set of neighboring frames of the determined candidate frames, in accordance with similarity between each of the neighboring frames and each of the candidate frames; and
   selecting at least one of the video frames from the first set of said frames and the second set of neighboring frames based on image quality,
   wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

21. A method, performed by at least one processor which executes a program stored in a storage, of selecting at least one video frame from a video sequence comprising a plurality of video frames, said method comprising:
   sampling a first set of said frames which are not continuous in the video sequence, wherein the frames of the first set are sampled throughout the video sequence in accordance with the first determined sampling pattern;
   determining candidate frames from the sampled frames based on image quality;
   sampling a second set of neighboring frames of the determined candidate frames, in accordance with similarity between each of the neighboring frames and each of the candidate frames; and
   selecting at least one of the video frames from the first set of said frames and the second set of neighboring frames based on image quality,
   wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

22. An apparatus for selecting at least one video frame from a video sequence comprising a plurality of video frames, said apparatus comprising:
   a storage storing a program;
   at least one processor executes the program stored in the storage,
   wherein the at least one processor executes:
   means for sampling a first set of said frames which are not continuous in the video sequence, wherein the frames of the first set are sampled infrequently throughout the video sequence in accordance with the determined sampling pattern;
   means for determining candidate frames from the sampled frames based on image quality;
   means for sampling a second set of neighboring frames of the determined candidate frames, in accordance with similarity between each of the neighboring frames and each of the candidate frames; and
   means for selecting at least one of the video frames from the first set of said frames and the second set of neighboring frames based on image quality,
   wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

23. A non-transitory computer readable medium having a program stored on the medium for at least one processor to perform a method for selecting at least one video frame from a video sequence comprising a plurality of video frames, said method comprising:
   code for sampling a first set of said frames which are not continuous in the video sequence, wherein the frames of the first set are sampled throughout the video sequence in accordance with the determined sampling pattern;
   code for determining candidate frames from the sampled frames based on image quality;
   code for sampling a second set of neighboring frames of the determined candidate frames, in accordance with similarity between each of the neighboring frames and each of the candidate frames; and
   code for selecting at least one of the video frames from the first set of said frames and the second set of neighboring frames based on image quality,
   wherein in a case where the similarity between a first neighboring frame and a predetermined candidate frame is lower than the similarity between a second neighboring frame and the predetermined candidate frame, the sampling of the second set of neighboring frames is executed such that the first neighboring frame is sampled with priority higher than the second neighboring frame.

* * * * *